Figure 1:
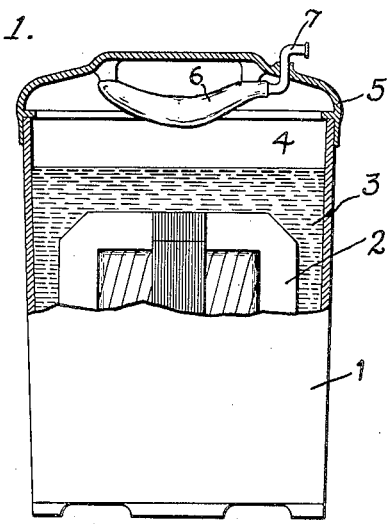

D. DU BOIS.
EXPANSION CHAMBER FOR ELECTRICAL APPARATUS.
APPLICATION FILED NOV. 1, 1913.

1,227,404.  Patented May 22, 1917.

WITNESSES:  INVENTOR:
Max Wasbird.  Delafield DuBois,
Helen Orford  BY
  HIS ATTORNEY.

UNITED STATES PATENT OFFICE.

DELAFIELD DU BOIS, OF NEW YORK, N. Y., ASSIGNOR TO GENERAL ELECTRIC COMPANY, A CORPORATION OF NEW YORK.

EXPANSION-CHAMBER FOR ELECTRICAL APPARATUS.

1,227,404.  Specification of Letters Patent.  Patented May 22, 1917.

Application filed November 1, 1913. Serial No. 798,715.

*To all whom it may concern:*

Be it known that I, DELAFIELD DU BOIS, a citizen of the United States, residing at New York, county of New York, State of New York, have invented certain new and useful Improvements in Expansion-Chambers for Electrical Apparatus, of which the following is a specification.

My invention relates to electrical apparatus submerged in generally stable fluids. Transformers and oil switches are representative of the class of apparatus to which my invention relates. I shall describe it as applied to a transformer since it may be readily understood in connection with this apparatus.

When a transformer is submerged in a liquid, one difficulty always encountered is that due to the tendency of the liquid, and the air in the tank above the liquid, to expand and contract as its temperature rises and falls due to outside influences or as the transformer load increases and decreases. To seal the tank and allow no expansion and contraction of the materials within is undesirable both on account of the mechanical difficulties encountered and on account of the differences between the pressure of the atmosphere and the pressure within the tank. In most cases therefore it is far more preferable to allow for an exchange of air between the atmosphere and the interior of the tank.

But there are serious objections to a free exchange of air between the atmosphere and the interior of a transformer tank. As is well known the insulating qualities of the oils commonly used in tanks containing electrical apparatus are greatly impaired by the presence of even a very small percentage of moisture. In the outside air there is always more or less moisture in suspension and some of this moisture is carried into the tank each time air enters and a part ultimately finds its way into the liquid.

The object of my invention is to provide for the free normal expansion and contraction of the materials within the tank as their temperature changes in such a manner that it is impossible for the outside air to reach the fluid of the tank. I do this by providing as a part of the tank an expansible member subject on the one hand to the atmosphere and on the other to the fluids of the interior of the tank, preferably the air above the liquid therein. As the materials within the tank expand, they expand against this member and through it displace equivalent volumes of atmospheric air, and as they contract are replaced in volume by the atmosphere. The action is very similar to a free exchange of air between the interior and the exterior of the tank but since the expansible member always separates the atmosphere from the liquid of the tank and the air above and in contact with it, no moisture from the atmosphere can enter the liquid. Of course this construction requires that the tank be sealed but this becomes a comparatively simple matter and is not objectionable, since the difference between the pressures within and without the tank is never great. This difference only amounts to so much as is exerted by the expansible member itself.

Preferably the expansible member is a bag of any flexible air tight material. It may be located outside of the tank, the interior of the bag communicating with the interior of the tank above the liquid level. With such a device some of the air above the liquid in the tank is forced into the bag as the transformer temperature rises; the expansion of the bag against the external air accommodates the increase in volume. As the transformer cools the pressure of the atmosphere on the bag returns the same air to the tank again. Preferably, however, the expansible member is located within the tank and its interior communicates with the atmosphere. This makes a compact, self-contained structure. In this case the action is reversed. As the temperature rises the bag is contracted and air is forced from it to the atmosphere; as the transformer cools again the atmospheric pressure forces it to expand and the air flowing into it maintains the total volume and pressure in the tank constant.

Figure 2:
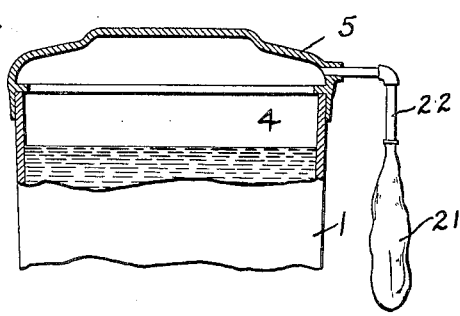

The accompanying drawings which form a part of this specification illustrate three forms which my invention may assume. Figure 1 is an elevation of a transformer tank partly in section to which my invention in its preferred form is applied. Fig. 2 illustrates a modification thereof.

In the transformer tank 1 is submerged in the oil 3 the transformer 2. Above the oil is an air space or chamber 4. The tank is closed by the cover 5; suspended from the cover within the tank is a bag 6 which may be made of oiled silk or any other material which may meet the requirements. The interior of the bag 6 communicates with the atmosphere through the pipe 7. The tank is air tight, but since the difference between the pressure of the atmosphere and the interior of the tank is never great, as will be readily understood, this construction is not a difficult one or objectional. I prefer this form of construction since it is entirely self-contained and there is no projecting apparatus outside of the tank.

The operation of this construction is as follows: As the transformer 2 assumes more load, the oil in which it is submerged and the air in the space 4 become heated and the pressure of the air in the space 4 on the bag 6 increases. This forces the bag 6 to collapse, driving air from it to the atmosphere until the pressure in the chamber 4 is substantially equal to the atmospheric pressure within the bag 6. When the load on the transformer decreases and the air in the chamber 4 loses its heat, its pressure decreases and air flows back from the atmosphere through the pipe 7 to the interior of the bag 6 expanding it until again the pressure of the air in the chamber 4 is again equal to the atmospheric pressure. Of course it will be understood that in actual practice this exchange of air between the interior of the bag 6 and the atmosphere is taking place gradually and more or less constantly.

In Fig. 2 I have illustrated a modification. The bag 21 is located outside of the transformer tank 1 and the interior of the bag is connected with the air space 4 within the tank by the pipe 22. The operation of this construction is different from the operation of the precedingly described construction only in that the air within the chamber 4 expands into the bag 21 and is returned again from the bag 21 on the cooling of the transformer.

These are only a few of all the possible forms which my invention may assume and it will be understood that my invention is not limited to these forms, but that I intend in the appended claim to include all modifications.

What I claim as new and desire to secure by Letters Patent of the United States, is:—

The combination with a tank, oil therein and electrical apparatus submerged in the oil, of a flexible bag-like member subject on its interior and exterior to the opposing pressures of the interior of the tank and the atmosphere.

In witness whereof, I have hereunto set my hand this 29th day of October, 1913.

DELAFIELD DU BOIS.

Witnesses:
　JOHN E. MURRAY,
　E. J. MURRAY.